United States Patent
Highnam et al.

(10) Patent No.: US 7,260,254 B2
(45) Date of Patent: Aug. 21, 2007

(54) COMPARING IMAGES

(75) Inventors: Ralph Philip Highnam, Oxford (GB); Peter Eric Taylor, Oxford (GB); Bruno Ancelin, Oxford (GB); John Michael Brady, Oxford (GB)

(73) Assignee: Mirada Solutions Limited, Oxford (GB)

( * ) Notice: Subject to any disclaimer, the term of this patent is extended or adjusted under 35 U.S.C. 154(b) by 564 days.

(21) Appl. No.: 10/303,225

(22) Filed: Nov. 25, 2002

(65) Prior Publication Data

US 2004/0101185 A1 May 27, 2004

(51) Int. Cl.
*G06K 9/00* (2006.01)

(52) U.S. Cl. ...................... 382/132; 382/128

(58) Field of Classification Search ........ 382/130–133, 382/218, 284, 294, 305, 128, 278, 287, 289, 382/293, 173, 190, 199; 250/556, 559.2, 250/565; 356/39, 71; 377/10; 348/130, 348/333.05, 43; 378/23
See application file for complete search history.

(56) References Cited

U.S. PATENT DOCUMENTS

| | | | |
|---|---|---|---|
| 5,144,123 A * | 9/1992 | Malashanko | 250/214 VT |
| 5,715,334 A * | 2/1998 | Peters | 382/254 |
| 5,729,620 A * | 3/1998 | Wang | 382/128 |
| 5,828,774 A * | 10/1998 | Wang | 382/128 |
| 6,067,342 A * | 5/2000 | Gordon | 378/19 |
| 6,067,373 A * | 5/2000 | Ishida et al. | 382/130 |
| 6,285,781 B1 * | 9/2001 | Yamazaki | 382/132 |
| 6,574,357 B2 * | 6/2003 | Wang | 382/132 |
| 6,650,766 B1 * | 11/2003 | Rogers et al. | 382/132 |
| 6,819,786 B2 * | 11/2004 | Hirai | 382/132 |
| 2002/0006218 A1 * | 1/2002 | Sako | 382/132 |
| 2002/0081025 A1 * | 6/2002 | Wagman | 382/170 |
| 2002/0154802 A1 * | 10/2002 | Goldkuhl et al. | 382/132 |
| 2003/0016856 A1 * | 1/2003 | Walker et al. | 382/132 |
| 2003/0043962 A1 * | 3/2003 | Lai | 378/23 |
| 2003/0048938 A1 * | 3/2003 | Wang et al. | 382/132 |
| 2003/0063788 A1 * | 4/2003 | Boland et al. | 382/132 |
| 2003/0222976 A1 * | 12/2003 | Duran | 348/43 |
| 2005/0084178 A1 * | 4/2005 | Lure et al. | 382/294 |

FOREIGN PATENT DOCUMENTS

WO   WO 00/52641   9/2000

OTHER PUBLICATIONS

Highnam et al., "Mammographic Image Analysis," Chapters 2, 3, 7, and 10, Kluwer Academic Press, 2000.
Kostas, "Proceedings of MIUA (Medical Image Understanding and Analysis)," pp. 113-116, Birmingham, UK, 2001.

* cited by examiner

*Primary Examiner*—Duy M. Dang
(74) *Attorney, Agent, or Firm*—Kalow & Springut LLP

(57) ABSTRACT

Comparing first and second images taken on different imaging systems and under different exposure conditions is achieved by the steps of: applying a model to the data representing the first image, which model simulates at least one process step in the creation of said first image, to derive a representation of the first image at a level of processing common to the creation of the second image; and applying a further model to said representation, which model simulates at least one process step in the creation of said second image, to derive a further representation of the first image which corresponds to the same level of processing as said second image.

19 Claims, 4 Drawing Sheets

COMPARING IMAGES

BACKGROUND OF THE INVENTION

1. Field of the Invention

The present invention relates to a method and apparatus for comparing images of the same object.

2. Description of the Related Art

The background will be discussed in the context of one particular application: mammography.

Mammography has been film-based for many years and there are now many different manufacturers of X-ray equipment for mammography. This in itself makes comparison of images of the same breast taken on different X-ray machines difficult, as there is a lot of variability in the imaging equipment, film and more simply, acquisition parameters. Over the last 2 years however the introduction of digital mammography in several forms has started to generate digital images instead of films and radiologists are now faced with the task of comparing films and digital images. This is clearly not easy to do and many quotations in academic and clinical papers have now revealed how much radiologists dislike doing this.

The situation might arise in many different situations, e.g.:

comparing films from X years previously with films from today;

comparing films from X years previously with digital images from today;

comparing films from a screening centre with digital images taken in an assessment clinic; and comparing digital images from one system to digital images from another system.

Currently, films and digital images are compared by putting the film on a light box next to the computer screen on which the digital image is displayed. The display is obviously completely different, one being back-projection with a particular luminance and the other being a fluorescent display with a specific gamma. The apparent brightness and contrast of the mammogram would then be different from one display to the next. Morover, some digital equipment performs some post-processing of the data. All this makes the objective comparison of, for instance, breast density, virtually impossible.

On top of that, it is difficult to compare images using a digital mammography workstation because the parameters may have to be re-set whenever other digital mammograms are imported. A further issue is that there are technically significant differences between the ways images are acquired from one digital system to the next. The image produced by mammographic equipment depends on:

1) the X-ray emitter characteristics (voltage, current, anode metals, etc.)
2) the X-ray absorption characteristics of the breast,
3) the transfer of X-Ray energy to detectable photons;
4) the transfer of photon into electrical impulse on the CCD (Charge coupled device), if the equipment uses any.

There are typically half a dozen different technologies available in digital mammographic equipment (Cesium Iodide with amorphous silicon, phosphor, selenium, etc), all of which produce different images because even if step 2) is supposed to remain constant over time, steps 1), 3) and 4) relate to physical interactions of materials, which are different from equipment to equipment.

SUMMARY OF THE INVENTION

It is therefore an object of the invention to alleviate, at least partially, any of the above problems.

Accordingly, the present invention provides a method for comparing first and second images of the same object, the images having been created by processes which differ by at least one process step, said method comprising the steps of:

applying a model to the data representing the first image, which model simulates at least one process step in the creation of said first image, to derive a representation of the first image at a level of processing common to the creation of the second image; and applying a further model to said representation, which model simulates at least one process step in the creation of said second image, to derive a further representation of the first image at a level of processing for comparison with said second image.

A further aspect of the invention provides a method for comparing first and second images of the same object, the images having been created by processes which differ by at least one process step, said method comprising the steps of:

applying a model to the data representing the first image, which model simulates at least one process step in the creation of said first image, to derive a representation of the first image at a level of processing common to the creation of the second image; and applying a further model to the data representing the second image, which model simulates at least one process step in the creation of said second image, to derive a representation of the second image which corresponds to said common level of processing.

DETAILED DESCRIPTION OF THE PREFERRED EMBODIMENTS

The present invention will next be described in more detail by way of example. However the present invention should not be construed as being limited thereto.

The currently preferred mode of putting the invention into effect will be described in the context of mammography.

Figure 1:
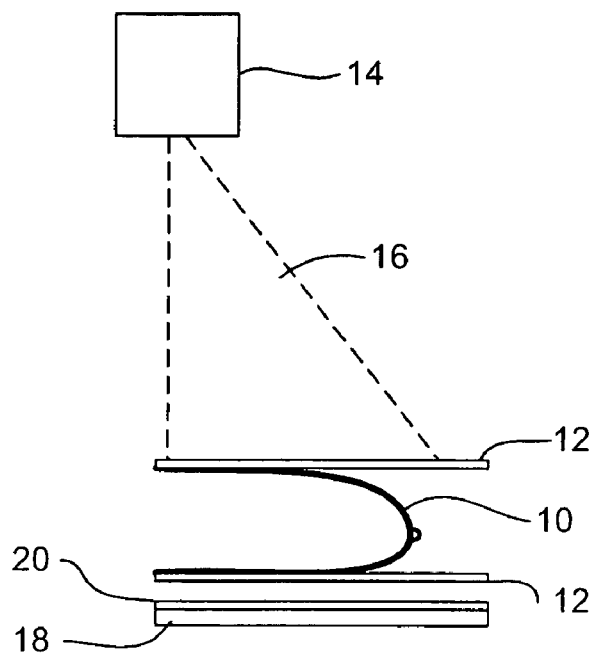
FIG. 1 shows a schematic representation of an analog X-ray mammography system.
Figure 2:
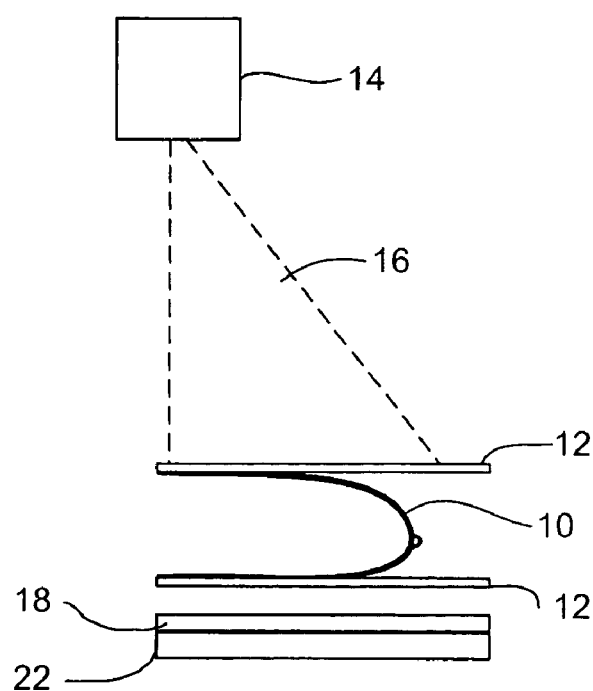
FIG. 2 shows a schematic representation of a digital X-ray mammography system.

To assist understanding of the invention, the acquisition of X-ray mammograms will first be described with reference to FIGS. 1, 2 and 3. As shown in FIG. 1, which describes an analog system, a breast 10 is located between compression plates 12. An X-ray tube 14, which includes a target anode, produces a beam of X-rays 16 which impinges on the breast 10. Scattering processes occur in the tissue of the breast 10 which modify the beam of X-rays before it exits the breast. The intensity of the beam exiting the breast is related to the thickness and type of tissue in the breast. The X-ray photons in the beam exiting the breast then reach an intensifying screen 18 (Phosphor, Cesium Iodide, Selenium plate, etc.). If an X-ray photon is absorbed by the screen 18, light photons are emitted by the phosphor and these light photons expose a film 20 located on the screen 18. The film 20 is then processed to produce a mammogram. The processes described above are represented in FIG. 3 by the sequence of boxes 1, 2, 3, 4a and 6a.

Figure 3:
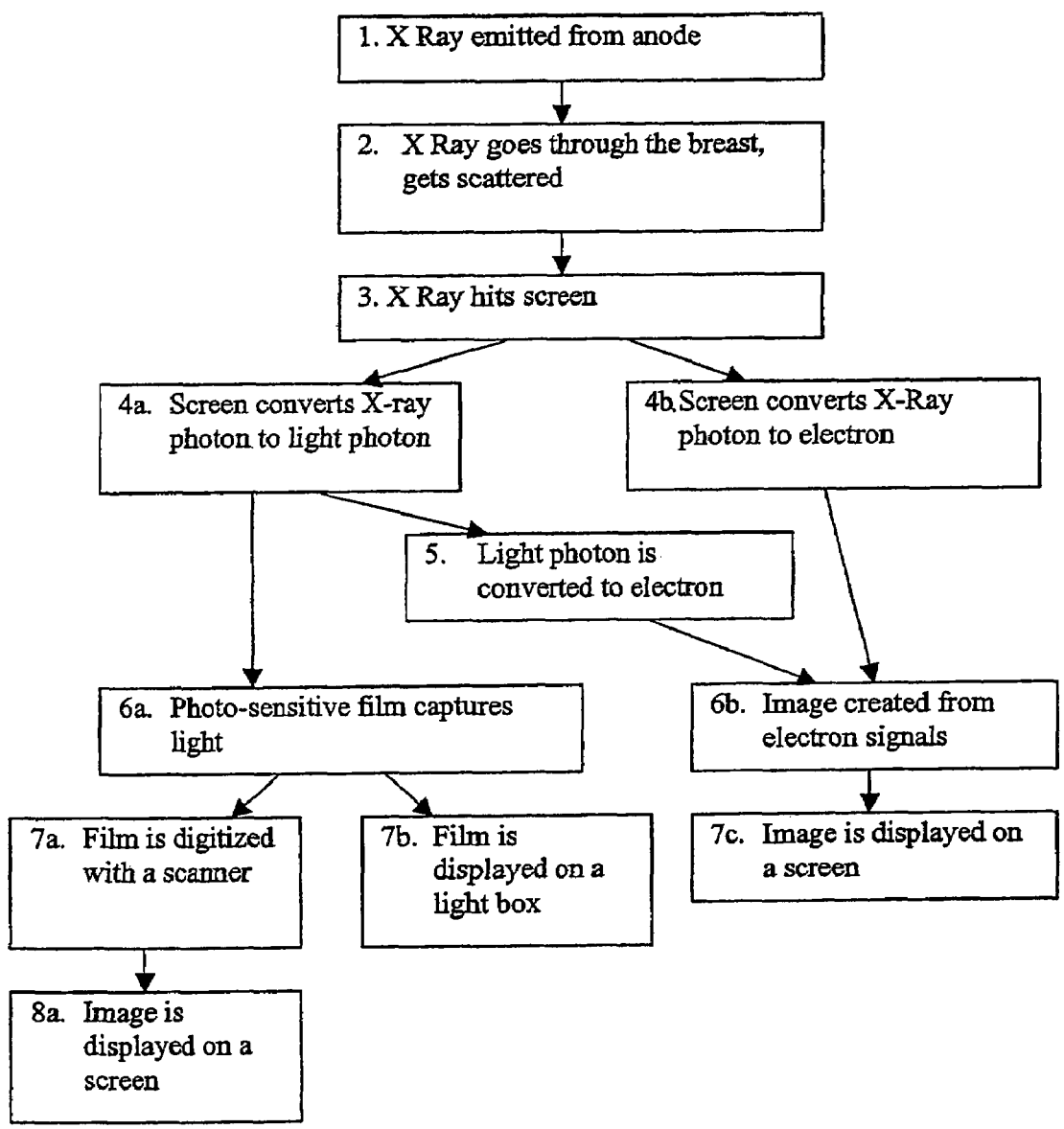
FIG. 3 depicts a number of possible sequences of physical processes in X-ray mammography image acquisition.

A clinician can then view the image by displaying it on a light box, as indicated in box 7b in FIG. 3. One way to generate a digital image is to use a laser scanner system or similar to digitize the film as indicated in box 7a in FIG. 3. The digitized image can then be displayed, on for example a computer monitor screen (box 8a in FIG. 3).

Alternatively, digital images can be obtained using more recent systems that do not require exposure of a light-sensitive film; these are known as "direct digital images". As shown in FIG. 2, one technique is to remove the film and use instead a detector 22, such as a CCD, which converts light photons emitted by the screen 18 into electric signals from which a digital image can be created. This is represented by boxes 4a, 5 and 6b in FIG. 3. Alternatively, some techniques do not require the X-ray to be converted to light photons and instead comprise a screen or substrate which converts the X-ray photon directly into electric signals. The electric signals can then be used to create a digital image. These processes are represented by boxes 4b and 6b in FIG. 3. These two techniques for creating direct digital images are, of course, merely representative of the many possible alternative techniques. The direct digital image can be displayed on a screen of a computer monitor for viewing by a clinician at box 7c in FIG. 3.

Essentially, each box in FIG. 3 represents a physical process of interaction of energy/photons with matter, such as the intensifying screen emitting light, at a certain place with a certain angular distribution, when hit by X-rays, or the detector in the digitizing scanner responding to the film image with particular wavelength and intensity characteristics. Optionally, further components, such as collimators and anti-scatter grids can be included in the apparatus (not shown in FIGS. 1 and 2), and further processing of the image, sometimes called post-processing, such as edge-enhancement, can be performed before the image is displayed. All of the above processes correspond to a transformation of the underlying core informational content of the image. After each process the image will have a certain representation. Thus each final image corresponds to a core of information which has been altered by instrument artefacts, such as acquisition and display parameters, and possibly by post-processing. It is possible to simulate mathematically each of these processes and also to reverse each of these processes mathematically, using suitable models. Suitable mathematical models are disclosed for example in Highnam & Brady, "Mammographic Image Analysis", Kluwer Academic Publishers (ISBN 0-7923-5620-9) and elsewhere.

Embodiments of the present invention enable two images to be compared by applying a mathematical model by which the images can be made to look like each other via a common representation. The common representation is a representation at a level of processing that is common to the two final images i.e. prior to that level the same processes have been involved in the acquisition of the image. A "level of processing" can be considered to be, for example, a particular box in FIG. 3. This will be explained in more detail with some examples below. Rather than performing ad hoc direct techniques for mapping between the two images, embodiments of the invention first transform at least one of the images to an intermediate, common representation.

A simple example would be to compare a digitized image displayed on a screen (box 8a in FIG. 3) with a film displayed on light box (box 7b in FIG. 3). Modeling can be applied to convert the screen image back to the image captured on the original film (box 6a), using known properties of the display and the digitizer. Simulation can then be applied to process the modeled film image so that when displayed on a screen it has the same appearance as a film on a light box. Thus the two images can be compared, like two film images, and the common representation used in this method was that of the light sensitive film (box 6a).

Figure 4:
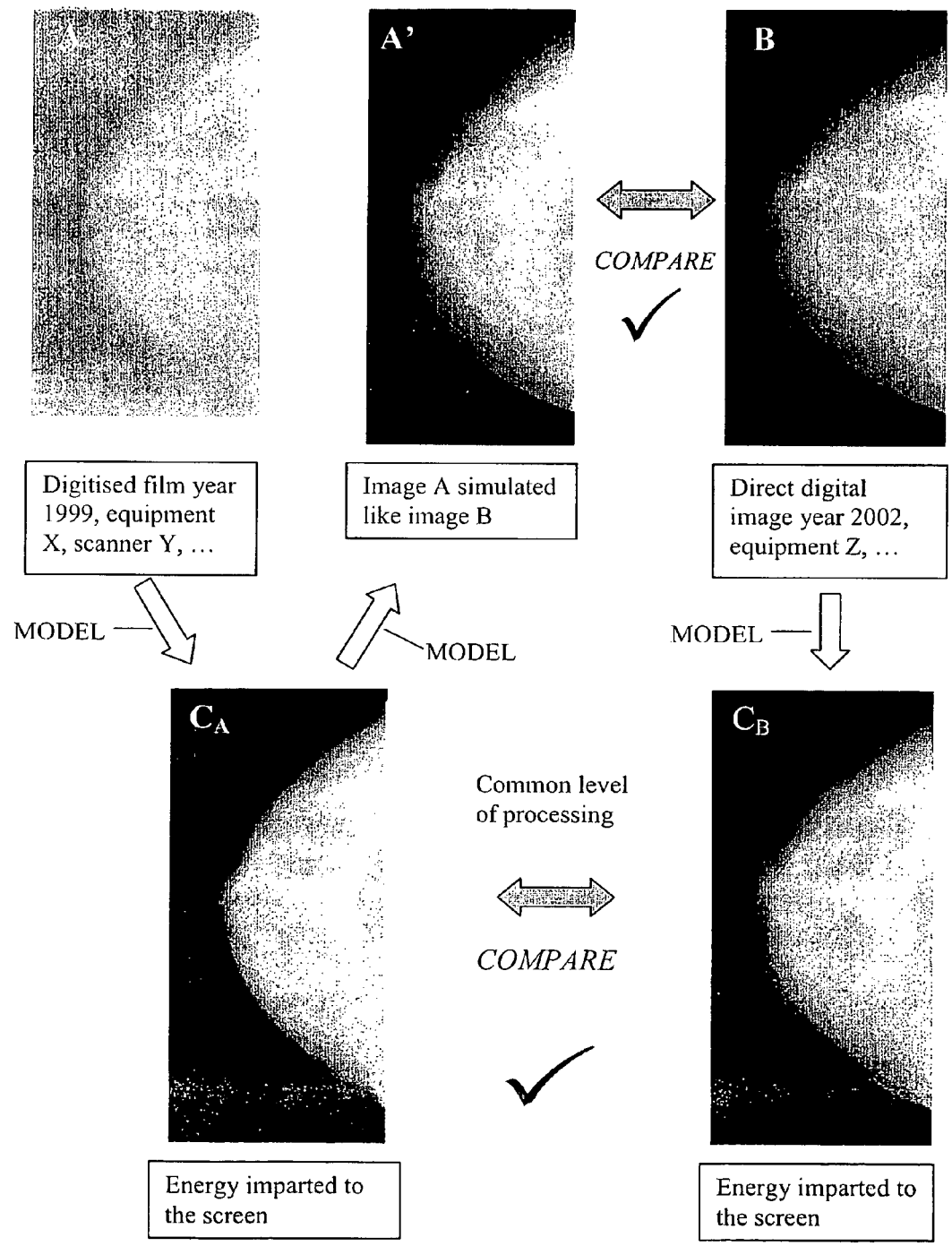
FIG. 4 illustrates how two different images can be compared according to two different methods embodying the invention for obtaining comparable representations of the images.

Another example would be to compare a digitized film image (box 8a in FIG. 3) illustrated as image A in FIG. 4, with a direct digital image (box 7c in FIG. 3) illustrated by image B in FIG. 4. One technique is to convert the digitized film image A into an image corresponding to the x-ray energy distribution hitting the screen 18, illustrated by image $C_A$ in FIG. 4 (corresponding to box 3 in FIG. 3). This can be done using the known parameters of the digitizing scanner and the x-ray equipment. Further modeling is applied to convert image $C_A$ into image A', which is a simulation of the direct digital imaging process based on the parameters of the apparatus used to obtain image B. Images A' and B can then be compared. The common comparable representation used in this technique was the x-ray energy hitting the screen 18, i.e. box 3 in FIG. 3.

An alternative technique for comparing images A and B is to convert image A to $C_A$ as above, and to convert image B to image $C_B$ in FIG. 4. Image $C_B$ is obtained by applying a mathematical model to reverse the processing in the direct digital image acquisition apparatus to simulate the x-ray intensity distribution (box 3 in FIG. 3). The conversion of image B to $C_B$ is simply the reverse of the conversion of image $C_A$ to image A' in the previous example. Images $C_A$ and $C_B$ can then be directly compared. The "common representation" C is the x-ray energy distribution, i.e. both images are converted into a representation of the x-ray energy distribution.

A further alternative embodiment is to transform image B to a common representation image C and then to transform image C to a later intermediate level in the process for the creation of image A, for example to the level of light intensity at the photographic film (box 6a in FIG. 3). Image A is also transformed back to that intermediate level (e.g. light intensity at the photographic film) and can then be compared with the transformation of image C (derived from image A).

Another embodiment of the invention is to transform both images A and B to a common representation C and then to further transform them both to a representation D which is optimal in some way for comparison purposes. According to a preferred embodiment of the invention, the images are converted to the Standard Mammogram Form (SMF) described in WO 00/52641, U.S. application Ser. No. 09/914,460 and EP application number 00905175.6.

To enhance the method of any of the above embodiments of the invention, processing can be applied to achieve registration between the images to correct for example for different positioning of the body in the images and non-rigid deformations. Further details are disclosed for example in Proceedings of MIUA (workshop on Medical Image Understanding and Anslysis) 2001, Birmingham, UK, pages 113-116 "Volume preserving elastic transformation for local breast-tissue quantification" by Kostas Marias, Christian Behrenbruch, Ralph Highnam, Michael Brady, Santilal Parbhoo and Alexander Seifalian (ISBN 1 901725 15 5). The registration is applied when the images are in the same representation e.g. both X-ray energy distributions or both representations of direct digital images.

Figure 5:
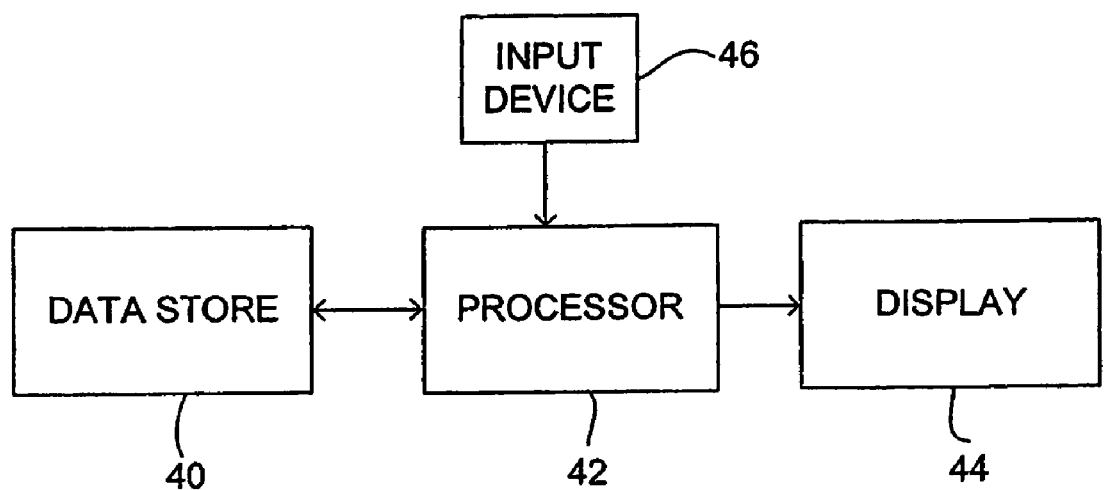
FIG. 5 is a block diagram schematically showing a computer system for implementing the invention.

FIG. 5 illustrates schematically a computer system for use in the comparison of images according to the invention. The software for performing a method embodying the invention is stored in data store 40 and is executed by processor 42. Data corresponding to at least one image to be compared can also be stored in data store 40 together with a database of parameters for the model or models which simulates the image acquisition and display processes performed by a variety of X-ray equipment components, scanners, light boxes, detectors and so on, from one or more different manufacturers. The input device 46, such as keyboard or mouse enables the user to select the images and processes to be performed and the result may be displayed on the display 44 e.g. a computer monitor, for example to display two comparable images side-by-side or to display a processed digital image so that it appears like a film on a light box image.

Embodiments of the invention are equally applicable to the automated comparison of images performed by a computer, or to comparison performed by a person. Although described with respect to the comparison of two images, the invention can be used for comparison of more than two images; two is the minimum number, and any comparison of more than two images would involve at least the comparison of two images within the scope of the claims.

Although the present invention has been described in terms of X-ray mammography, it is, of course more widely applicable, for example to ultrasound or magnetic resonance or X-ray or standard camera images, and to medical images other than mammograms; indeed the invention is applicable to the comparison of images outside of the field of medicine.

What is claimed is:

1. A method for comparing first and second images of a same object, the images having been created by processes which differ by at least one process step, said method comprising the steps of:
    applying a model to data representing the first image, which model simulates reversal of at least one physical process step in creation of said first image, to derive a representation of the first image at a level of processing representing a common point in a sequence of physical processes in the creation of the first and second images; and
    applying a further model to said representation, which model simulates at least one physical process step in creation of said second image, to derive a further representation of the first image at another level of processing compatible with said second image for comparison with said second image.

2. A method according to claim 1, further comprising the step of applying registration between the second image and the representation of the first image before comparing them.

3. A method according to claim 1, wherein said first and second images have been created using different apparatuses.

4. A method according to claim 1, wherein one of said first and second images is a digital image and the other is an analog image.

5. A method according to claim 1, wherein the images are medical images.

6. A method according to claim 5, wherein each of said first and second images is selected from the group consisting of ultrasound images, magnetic resonance images and X-ray images.

7. A method according to claim 1, wherein said first and second images are mammograms.

8. A computer program stored on a computer-readable medium comprising program code means for executing on a computer the method of claim 1.

9. A computer program product stored on a computer-readable medium carrying the computer program of claim 8.

10. A method for comparing first and second images of a same object, the images having been created by processes which differ by at least one process step, said method comprising the steps of:
    applying a model to data representing the first image, which model simulates reversal of at least one physical process step in the creation of said first image, to derive a representation of the first image at a level of processing representing a common point in a sequence of physical processes in creation of the first and second images; and
    applying a further model to data representing the second image, which model simulates reversal of at least one physical process step in creation of said second image, to derive a representation of the second image at said level of processing representing said common point in the sequence at physical processes in creation of the first and second images.

11. A method according to claim 10, further comprising the step of processing both the derived representation of the first image and the derived representation of the second image to obtain a further representation of each image in a common format for comparison.

12. A method according to claim 10, further comprising the step of applying registration between the second image and the representation of the first image before comparing them.

13. A method according to claim 10, wherein said first and second images have been created using different apparatuses.

14. A method according to claim 10, wherein one of said first and second images is a digital image and the other is an analog image.

15. A method according to claim 10, wherein the images are medical images.

16. A method according to claim 15, wherein each of said first and second images is selected from the group consisting of ultrasound images, magnetic resonance images and X-ray images.

17. A method according to claim 10, wherein said first and second images are mammograms.

18. A computer program stored on a computer-readable medium comprising program code means for executing on a computer the method of claim 10.

19. A computer program product stored on a computer-readable medium carrying the computer program of claim 18.

* * * * *